US011100297B2

(12) United States Patent
Dechu et al.

(10) Patent No.: US 11,100,297 B2
(45) Date of Patent: Aug. 24, 2021

(54) PROVISION OF NATURAL LANGUAGE RESPONSE TO BUSINESS PROCESS QUERY

(71) Applicant: International Business Machines Corporation, Armonk, NY (US)

(72) Inventors: Sampath Dechu, Hyderabad (IN); Neelamadhav Gantayat, Hebbal (IN); Monika Gupta, Rohini (IN)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 213 days.

(21) Appl. No.: 16/384,652

(22) Filed: Apr. 15, 2019

(65) Prior Publication Data
US 2020/0327201 A1 Oct. 15, 2020

(51) Int. Cl.
*G06F 40/56* (2020.01)
*G06Q 10/06* (2012.01)
*G06F 16/9032* (2019.01)

(52) U.S. Cl.
CPC ........ *G06F 40/56* (2020.01); *G06F 16/90332* (2019.01); *G06Q 10/067* (2013.01)

(58) Field of Classification Search
CPC .. G06F 40/56; G06F 16/90332; G06Q 10/067
See application file for complete search history.

(56) References Cited

U.S. PATENT DOCUMENTS

| | | | | |
|---|---|---|---|---|
| 6,615,166 B1* | 9/2003 | Guheen | ................. | G06Q 10/06 703/27 |
| 7,160,541 B2* | 1/2007 | Springer | ................. | A61P 1/04 424/144.1 |
| 8,135,576 B2* | 3/2012 | Haley | ................. | G06F 40/30 704/9 |
| 8,694,541 B1 | 4/2014 | Wilkinson | | |
| 8,903,711 B2* | 12/2014 | Lundberg | ................ | G06F 40/58 704/8 |
| 9,092,802 B1 | 7/2015 | Akella | | |
| 9,189,742 B2* | 11/2015 | London | ................... | G06N 5/04 |

(Continued)

FOREIGN PATENT DOCUMENTS

WO WO2017137246 A1 8/2017

*Primary Examiner* — Michael N Opsasnick
(74) *Attorney, Agent, or Firm* — Ference & Associates LLC

(57) ABSTRACT

One embodiment provides a method, including: receiving, from a user and at a user interface of a conversational agent, a query related to a business process; identifying, using process entity extraction on the query, (i) the business process and (ii) a business object corresponding to an entity of the query; mapping the business object to code corresponding to the business object, wherein the mapping comprises (i) mapping the business object to an object within a business process model using a domain dictionary and (ii) accessing code corresponding to the object within the business process model; generating a natural language response responsive to the received query by (i) extracting the code corresponding to the business object, (ii) identifying a rule within the extracted code corresponding to a variable of the query, and (iii) generating the natural language response from the identified rule; and providing the natural language response.

20 Claims, 4 Drawing Sheets

(56) References Cited

U.S. PATENT DOCUMENTS

| | | | | |
|---|---|---|---|---|
| 9,734,193 | B2* | 8/2017 | Rhoten | G06F 16/90332 |
| 2003/0046114 | A1* | 3/2003 | Davies | G06F 19/00 |
| | | | | 705/3 |
| 2004/0027349 | A1* | 2/2004 | Landau | G06F 16/2474 |
| | | | | 345/440 |
| 2004/0107125 | A1* | 6/2004 | Guheen | G06Q 99/00 |
| | | | | 705/319 |
| 2008/0052078 | A1* | 2/2008 | Bennett | G06F 16/3329 |
| | | | | 704/257 |
| 2008/0059153 | A1* | 3/2008 | Bennett | G06F 40/20 |
| | | | | 704/9 |
| 2008/0097748 | A1* | 4/2008 | Haley | G06N 5/02 |
| | | | | 704/9 |
| 2016/0232155 | A1 | 8/2016 | Allen et al. | |
| 2018/0373753 | A1* | 12/2018 | Flaks | G06F 16/248 |

* cited by examiner

PROVISION OF NATURAL LANGUAGE RESPONSE TO BUSINESS PROCESS QUERY

BACKGROUND

When a user has a problem or question the user may interact with a conversational agent, for example, chatbot, digital assistant, virtual assistant, or the like. Chatbots generally capture text-based input, for example, a user may access a conversational window and provide text input to the window. The chatbot then processes the input and provides a responsive output, usually as a text-based output. Digital or virtual assistants may include assistants that receive voice input, process the voice input, and then provide a responsive output, for example, by audio, by performing a function, or the like. Conversational agents provide a method for a user to receive assistance with a problem or query that does not require a human user. The conversational agents are programmed to process input and provide output responsive to the input in a manner similar to how another human would engage in the conversation.

BRIEF SUMMARY

In summary, one aspect of the invention provides a method, comprising: receiving, from a user and at a user interface of a conversational agent, a query related to a business process, the business process indicating a domain of the query; identifying, using process entity extraction on the query, (i) the business process and (ii) a business object corresponding to an entity of the query, the entity indicating a task within the domain of the query; mapping the business object to code corresponding to the business object, wherein the mapping comprises (i) mapping the business object to an object within a business process model using a domain dictionary and (ii) accessing code corresponding to the object within the business process model; generating a natural language response responsive to the received query, wherein the generating comprises (i) extracting the code corresponding to the business object, (ii) identifying a rule within the extracted code corresponding to a variable of the query, and (iii) generating the natural language response from the identified rule; and providing, to the user at the user interface of the conversational agent, the natural language response.

Another aspect of the invention provides an apparatus, comprising: at least one processor; and a computer readable storage medium having computer readable program code embodied therewith and executable by the at least one processor, the computer readable program code comprising: computer readable program code configured to receive, from a user and at a user interface of a conversational agent, a query related to a business process, the business process indicating a domain of the query; computer readable program code configured to identify, using process entity extraction on the query, (i) the business process and (ii) a business object corresponding to an entity of the query, the entity indicating a task within the domain of the query; computer readable program code configured to map the business object to code corresponding to the business object, wherein the mapping comprises (i) mapping the business object to an object within a business process model using a domain dictionary and (ii) accessing code corresponding to the object within the business process model; computer readable program code configured to generate a natural language response responsive to the received query, wherein the generating comprises (i) extracting the code corresponding to the business object, (ii) identifying a rule within the extracted code corresponding to a variable of the query, and (iii) generating the natural language response from the identified rule; and computer readable program code configured to provide, to the user at the user interface of the conversational agent, the natural language response.

An additional aspect of the invention provides a computer program product, comprising: a computer readable storage medium having computer readable program code embodied therewith, the computer readable program code executable by a processor and comprising: computer readable program code configured to receive, from a user and at a user interface of a conversational agent, a query related to a business process, the business process indicating a domain of the query; computer readable program code configured to identify, using process entity extraction on the query, (i) the business process and (ii) a business object corresponding to an entity of the query, the entity indicating a task within the domain of the query; computer readable program code configured to map the business object to code corresponding to the business object, wherein the mapping comprises (i) mapping the business object to an object within a business process model using a domain dictionary and (ii) accessing code corresponding to the object within the business process model; computer readable program code configured to generate a natural language response responsive to the received query, wherein the generating comprises (i) extracting the code corresponding to the business object, (ii) identifying a rule within the extracted code corresponding to a variable of the query, and (iii) generating the natural language response from the identified rule; and computer readable program code configured to provide, to the user at the user interface of the conversational agent, the natural language response.

A further aspect of the invention provides a method, comprising: receiving, at a user interface of a chatbot, a query from a user requesting assistance with a business process, the business process indicating a field corresponding to the query; determining, by accessing an ontology related to the field, (i) the business process, (ii) a business object of the business process, the business object indicating a task of the business process, and (iii) a parameter of the query, the parameter corresponding to a variable of the query; accessing a business process model of the business process, wherein the business process model has corresponding code; extracting, from the corresponding code, code related to the determined business object; and providing, from the extracted code, a response to the query, wherein the providing comprises (i) identifying a rule within the extracted code and (ii) generating a response from the rule.

For a better understanding of exemplary embodiments of the invention, together with other and further features and advantages thereof, reference is made to the following description, taken in conjunction with the accompanying drawings, and the scope of the claimed embodiments of the invention will be pointed out in the appended claims.

DETAILED DESCRIPTION

Figure 1:
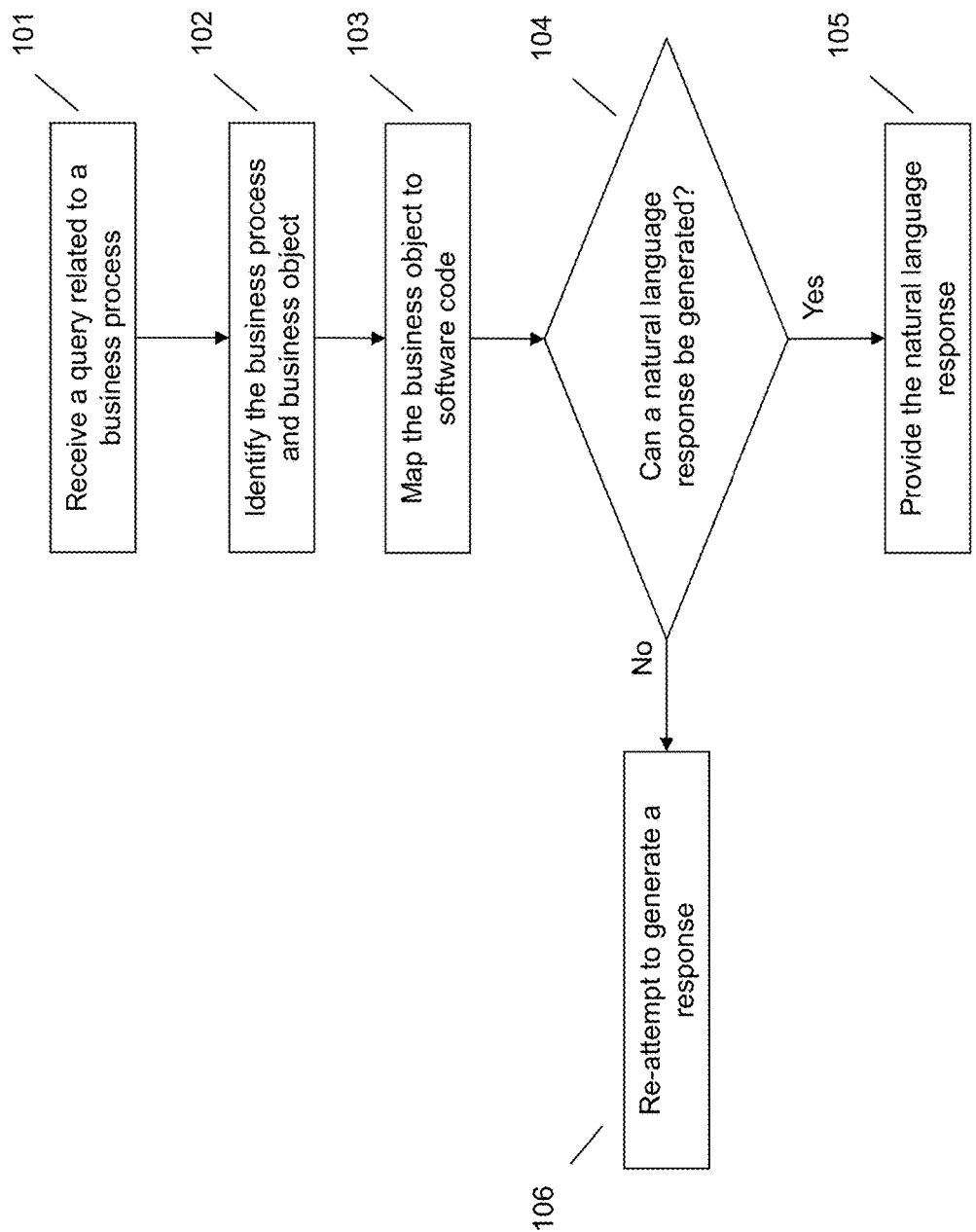
FIG. 1 illustrates a method of providing a natural language response using a conversational agent in response to receiving a query regarding a business process.

It will be readily understood that the components of the embodiments of the invention, as generally described and illustrated in the figures herein, may be arranged and designed in a wide variety of different configurations in addition to the described exemplary embodiments. Thus, the following more detailed description of the embodiments of the invention, as represented in the figures, is not intended to limit the scope of the embodiments of the invention, as claimed, but is merely representative of exemplary embodiments of the invention.

Reference throughout this specification to "one embodiment" or "an embodiment" (or the like) means that a particular feature, structure, or characteristic described in connection with the embodiment is included in at least one embodiment of the invention. Thus, appearances of the phrases "in one embodiment" or "in an embodiment" or the like in various places throughout this specification are not necessarily all referring to the same embodiment.

Furthermore, the described features, structures, or characteristics may be combined in any suitable manner in at least one embodiment. In the following description, numerous specific details are provided to give a thorough understanding of embodiments of the invention. One skilled in the relevant art may well recognize, however, that embodiments of the invention can be practiced without at least one of the specific details thereof, or can be practiced with other methods, components, materials, et cetera. In other instances, well-known structures, materials, or operations are not shown or described in detail to avoid obscuring aspects of the invention.

The illustrated embodiments of the invention will be best understood by reference to the figures. The following description is intended only by way of example and simply illustrates certain selected exemplary embodiments of the invention as claimed herein. It should be noted that the flowchart and block diagrams in the figures illustrate the architecture, functionality, and operation of possible implementations of systems, apparatuses, methods and computer program products according to various embodiments of the invention. In this regard, each block in the flowchart or block diagrams may represent a module, segment, or portion of code, which comprises at least one executable instruction for implementing the specified logical function(s).

It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

Specific reference will be made here below to FIGS. 1-4. It should be appreciated that the processes, arrangements and products broadly illustrated therein can be carried out on, or in accordance with, essentially any suitable computer system or set of computer systems, which may, by way of an illustrative and non-restrictive example, include a system or server such as that indicated at 12' in FIG. 4. In accordance with an example embodiment, most if not all of the process steps, components and outputs discussed with respect to FIGS. 1-3 can be performed or utilized by way of a processing unit or units and system memory such as those indicated, respectively, at 16' and 28' in FIG. 4, whether on a server computer, a client computer, a node computer in a distributed network, or any combination thereof.

The artificial intelligence that conversational agents use has become better, allowing the conversation to become more accurate and closer to a conversation with another person. For example, the natural language generation and understanding has improved so that the conversational agent system can more accurately identify the user request and provide a more accurate response or result. Additionally, using data analytics and collaborative filtering has also made the conversation system more accurate and more human-like. Traditionally, a conversational agent is programmed or designed by a conversational agent designer or programmer who provides the design of the dialog flow. The dialog flow includes multiple nodes that represent a dialog state identifying a possible response that can be provided by the conversational agent. As the conversation progresses, the conversational agent processes input received from a user and accesses a node within the dialog flow that is responsive to the received input. Thus, the conversational agent designer creates the nodes and provides an algorithm to the conversational agent so that the conversational agent can select and traverse nodes of the dialog flow.

However, a problem with this approach is that a programmer or designer has to manually create nodes and algorithms that allow the conversational agent to traverse the dialog flow. This can be tedious and time-consuming for the programmer or designer. Additionally, the programmer or designer may not be able to identify all possible conversation flows, thereby creating a conversational agent that may have conversational gaps, or have areas where the conversational agent is unable to provide a response to a user. Additionally, since the nodes and algorithms are programmed for a specific domain the conversational agent cannot be used for providing responses for another domain. Thus, if a user wants to use the conversational agent for another domain, new nodes and algorithms have to be programmed. Often times the solution to the problem of not having a conversational agent specifically programmed for a particular domain is to require a human operator or assistant to respond to the queries.

Accordingly, an embodiment provides a system and method for providing a natural language response, using a conversational agent, in response to receiving a query regarding a business process. The system receives, from a user and at a user interface of a conversational agent, a query related to a business process. A business process may include any type of process that may be defined within a process map, process model, or by performance steps. For example, a business process may include a service provided by an entity, for example, loan approvals, invoice processing, vehicle registration, or the like. Thus, the business process may indicate a domain of the query. From the query the system can perform process entity extraction to identify the business process and a business object corresponding to an entity of the query. The business object and, therefore, the entity, may indicate a task of the business process. For example, if the business process is loan approvals, the business object may be building permits. As another example, if the business process is invoice processing, the business object may be an invoice amount.

Once the business object is identified, the system maps the business object to code corresponding to the business object. Specifically, the system may access a business process model that corresponds to the business process and identify the object within the business process model that corresponds to the business object. Once the system has identified the object within the business process model, the system can access the code of the object within the business process model. From the code of the object the system can identify a rule that corresponds to a variable of the query. The system may then use the rule to generate a natural language response that is responsive to the query. This response can then be provided to the user through the user interface of the conversational agent. Thus, the system can automatically generate and provide a response without needing to be specifically programmed with a conversational flow and regardless of the domain of the query.

Such a system provides a technical improvement over current conversational agent systems by providing a system that can provide responses to user queries without requiring specific conversational flow programming as with conventional techniques. Rather, the described system and method can access code associated with the business process of the query and generate a response to the query using the business process model code. Thus, even without specific conversational agent domain programming, the described system can still generate a natural language response to a user query.

Additionally, since the conversational agent does not have to be specifically programmed to a particular domain, the conversational agent can be used across domains to respond to many different queries that may be associated with different domains. Accordingly, a programmer or designer does not have to perform the time-consuming and tedious process of generating conversational flow nodes and algorithms to allow the conversational agent to respond to queries. Thus, the described system and method provides a significant technical improvement to conventional conversational agents by providing a system that does not require a programmer or designer to specifically program the conversational or dialog flow of the conversational agent, thereby providing a system that reduces manual intervention as required by the conventional systems. Additionally, the described system and method provides a conversational agent that can be deployed more quickly than conventional systems and can be used across multiple domains, which is not possible using the conventional techniques.

FIG. 1 illustrates a method for providing a natural language response, using a conversational agent, in response to receiving a query regarding a business process. At 101 the system may receive a query from a user related to a business process. The query may be received through a user interface of a conversational agent. The business process may indicate a domain of the query. A business process may be any type of process that may be defined using a process map, business process model, or procedure steps. For example, a business process may be related to a service provided by an entity. For example, a business process may be related to loan approvals, vehicle registrations, invoice processing, infrastructure or building planning, scheduling, or the like. As an example, the query may be "My building plan is expiring in three months, do I need to renew it for loan sanction?" The business process may be non-commercial property loan approval, which also corresponds to the domain of the query.

The conversational agent may be an interactive virtual agent that communicates with a user using a text-based communication method, for example, a virtual assistant, automated instant messaging systems agent, chatbot, or the like. While the input provided to the chatbot window may be a text-based input, the text-based input may either be text-based input or may be derived from another input method, for example, voice input, touch-based input, or the like. In other words, the user may provide an audio query that is converted, by the system, into a text-based input to the conversational agent.

The conversational agent may be part of an application that allows a user to provide input or a query into the application, for example, in a communication window. The conversational agent then responds to the input and provides responsive output in the application. The conversational agent and application are intended to mimic a conversation between human users. As an example, the user may access an instant messaging customer service application that allows the user to communicate with a virtual assistant and request customer service assistance, for example, assisting the user in purchasing a particular item, assisting the user with technical issues, assisting the user with questions, or the like.

The communications window may be similar to a messaging application window or other applications in which a user communicates with another entity. The communications window may be a split window that allows space for communication between the user and conversational agent, or it may be a window that arranges the communication in a temporal manner. For example, the latest communication from the conversational agent or the user is displayed at the bottom of the window. A blank space or additional window may be provided for the user to input a query to be assessed by the conversational agent. The window may contain other functionalities associated with the conversation.

At 102 the system may identify the business process and a business object of the query, for example, using a query processor. Using the above loan approval example, the business object may be identified as "building plan." Additionally, the system may identify a parameter or attribute of the query. Again, using the above loan approval example, the parameter or attribute may be "expiring in three months" or "expiration date." To identify the business process, business object, and/or parameter the system may use a process entity extraction technique. The process entity extraction technique may include using a natural language processing technique that allows the system to annotate the different portions of the query to identify different entities contained within the query, for example, nouns, verbs, and the like. These entities can then be mapped to the business entities, for example, business object, objective, variable, attribute, and the like.

Example natural language processing techniques that may facilitate the entity extraction include parts-of-speech taggers, semantic/syntactic analysis, information extractors, and the like. For example, using a parts-of-speech tagger, the system may tag the query with the different parts of speech and then match the base form of the verb to a domain specific dictionary of verbs related to the domain or business process of the query. If the base form of the verb matches the domain dictionary, then the phrase occurring after the preposition may be tagged as the business objective. The query annotation may be performed using a supervised sequence labelling approach to train an entity and attribute recognition machine learning model. The machine learning model can then be deployed on user queries to annotate these queries.

The entity corresponding to the business object may indicate a task, within the domain identified by the business process, of the query. In other words, the business object may identify a more specific task within the domain that the query is related to. For example, if the business domain is loan approval, a business object may be building plans. To identify the business object the system may access an ontology corresponding to the business process. The ontology may be generated from a database corresponding to the business process and may include, or be derived from, business process models of the business process, user interface elements, the business logic or code corresponding to the business process, business process model(s), or user interface, and a rules database.

The business process model may be a visual representation of the different steps that are completed during performance of the business process. User interface elements may include elements of a user interface that corresponds to the business process. For example, in the case of a loan approval, the loan approval entity may have either an internal or external website or application to fulfill the business process. For example, the website or application may be used by either an employee of the loan approval entity to input loan approval information or a person requesting additional information regarding the loan approval process. This webpage or application may include user interface elements that allow a user to provide input. The business logic or code may be the code that corresponds to the business process model or user interface. In other words, the business logic or code may be the underlying logic or code that is used for performing the business process. The rules database may be a database that identifies the different rules that are used during performance of the business process. It should be understood that the business process itself does not need to be written down or generated. In other words, there does not need to be a document or model that specifically defines the steps of the business process. Rather, the system can access code that corresponds to the business process, a logic diagram corresponding to the business process, or other documentation or text that relates to the business process, to identify the steps or other attributes of the business process.

Figure 2:
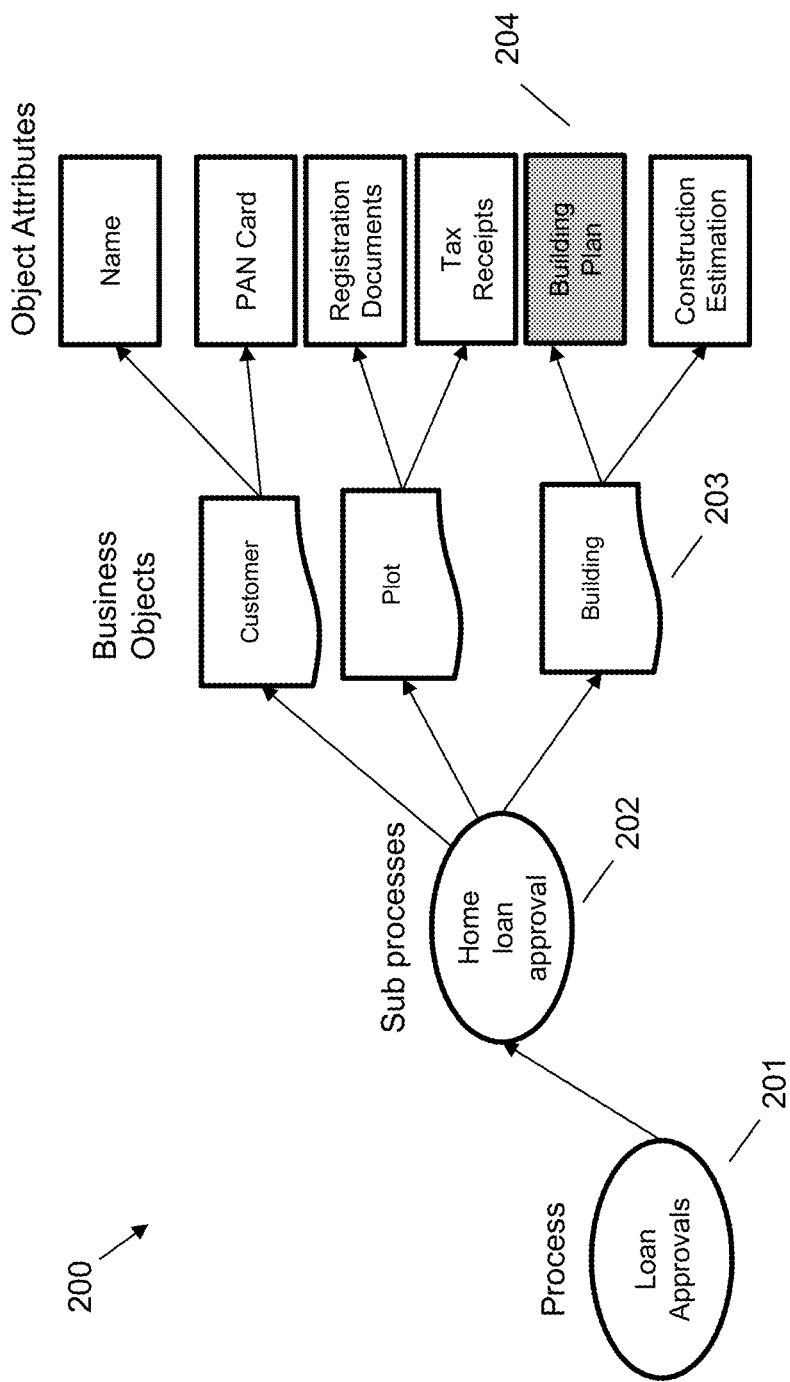
FIG. 2 illustrates an example ontology and traversal thereof.

To identify the business object from the business process, the system may parse the ontology and traverse the ontology using the extracted entities. For example, FIG. 2 illustrates an example ontology 200 for a loan approval business process 201. Using entities extracted from the query, the system may determine that the sub-process relates to home loan approval and may therefore traverse the ontology element for home loan approval 202. Traversal of this ontology element then leads to some business objects. From the query the system has identified that the business object is building plan 204. To access the building plan ontology element 204, the system may traverse the building ontology element 203. Once the business object is identified, the system can validate the existence of the process and the business data requirement for the process.

At 103 the system may map the identified business object to code corresponding to the business object. To perform this mapping, the system may map the business object to an object within a business process model or business process library using a domain dictionary. Thus, the system may access a business process model corresponding to the business process. Since the process ontology contains process titles and business data requirements, the system may utilize the process ontology elements that were traversed to identify the object within the business process model. However, since the business process model may contain terminology that is different than the terminology within the process ontology, the system may access a domain dictionary which identifies synonyms and terminology properties to identify terminology that is the same between the ontology and business process model. Additionally, the system may employ a similarity algorithm that can determine a text similarity between different terms, for example, based upon a similarity distance algorithm.

Once the object within the business process model is identified, the system may access the code, logic, or software that is associated with that object of the business process model. In the case that the business process model does not have corresponding code or the code is not accessible, the system may create code for the business process model by converting an image or structural representation of the business process model to code. In other words, the system may extract the control flow from a structural representation of the business process model to determine the code associated with each of the objects within the business process model. To create the code the system may identify the contours (e.g., lines, edges, etc.) of the business process model and identify the flow of the contours. The system may also identify the business process model objects which represent the tasks of the business process model and are frequently represented by different shapes and configurations of boxes or other shapes. The function of these business process model objects, specifically, the function corresponding to the shape, can be identified by accessing a business process model standard library. Once the contours and objects are identified, the system can label the contours and objects, for example, using the standard library.

From the labeled contours and objects the system can semantically interpret the contours and objects to create code corresponding to the business process model. In other words, the system can interpret the labeled contours and objects to represent the control flow of the business process, thereby, providing the logic for each of the objects. Thus, each object within the business process model will have corresponding code that can be accessed by the system to provide a response.

Mapping the business object to the corresponding code may also include applying task disambiguation. Task disambiguation assists in determining which task from similar tasks actually corresponds to the business object of the query. One technique for performing task disambiguation includes accessing a user interface corresponding to the business process. For example, if the entity having the business process has a webpage, application, or other user interface that corresponds to the business process, the system may access that user interface. The user interface may contain many different user interface elements that allow a user to provide input to the underlying application. The system can utilize this user interface to disambiguate a task or even access code associated with a particular business object represented by one of the user interface elements.

The task disambiguation process includes identifying a user interface element that corresponds to the business object. To identify the user interface element, the system may search the user interface for the identified task or business object. If the user interface contains the business object it can access the user interface element corresponding to the business object. From the accessed user interface element the system can find an attribute or parameter that is similar to the one included in the query. The system can then access the code for the user interface element and identify what application programming interface (API) the user interface element is calling. In other words, the system can identify the API corresponding to the user interface element. The system can then trace the API to the backend system to the business logic or code and access and obtain the code for the user interface element.

Task or process disambiguation may also be performed using tokens. Specifically, each business process model element may have a corresponding token. In the case that the query includes an entity that matches multiple business processes or tasks within a business process, the system may use the tokens to disambiguate which process flow or task actually corresponds to the query. For example, the system may perform an internal process or task or inter-process/inter-task disambiguation using other tokens that correspond to entities within the query to provide context for the process or task. In other words, based upon context surrounding the entity within the query, the system can disambiguate the process or task that corresponds to the query. As another example, the system may perform an external process or task or intra-process/intra-task by providing two different results to the user. In other words, if the token is matched with two different business process model elements, then the system may traverse both paths and provide the results of both paths to the user allowing the user to determine which result applies.

At 104 the system may determine whether a natural language response responsive to the query can be generated. To generate the natural language response the system may extract the code corresponding to the business object. Within the code the system may identify a rule that corresponds to a variable or parameter of the query. Using the loan approval example, the non-code formatted rule may be "business plan expiration should be greater than six months for loan approval." However, since the rule is defined in the format of code, the system may convert the code to something closer to natural language. This conversion may be facilitated through the use of an abstract syntax tree (AST). The AST is a tree representation of the abstract syntactic structure of the code. Each node of the tree represents a construct occurring in the code. Accordingly, the system may traverse the AST to extract conditions of the business object and value pairs corresponding to the attributes of the business object. Thus, the system may parse the AST to define the rule of the business object.

Once the rule is defined, the system can use a natural language generator to generate a natural language response from the rule. For example, from the extracted conditions and attributes, the system can use a natural language generator to generate natural language comments from the code, a natural language summary of the condition, and a natural language representation of the business logic. The generated natural language response may then contain the natural language summary of the business object attributes. Alternatively, the system may simply use domain mapping of the rule to a user action regarding the business object and use natural language generation to create a response based upon this mapping.

In the event that the natural language response cannot be generated at 104, the system may re-attempt to generate a response at 106. This re-attempt may include re-performing one or more of the preceding steps to determine whether a response can be generated. In the case that a response cannot be generated, even after the reattempt, the system may notify the user that a response cannot be generated. Additionally or alternatively, the system may notify a human operator of the inability to generate a response so that the human operator can take over the conversation with the user.

If, however, a response can be generated at 104, the system may provide the natural language response to the user at the user interface of the conversational agent at 105. The natural language response may include the summary of the business object attributes. Additionally, the response may include more than one response, for example, in the case that more than one business process or task was mapped to the query.

Figure 3:
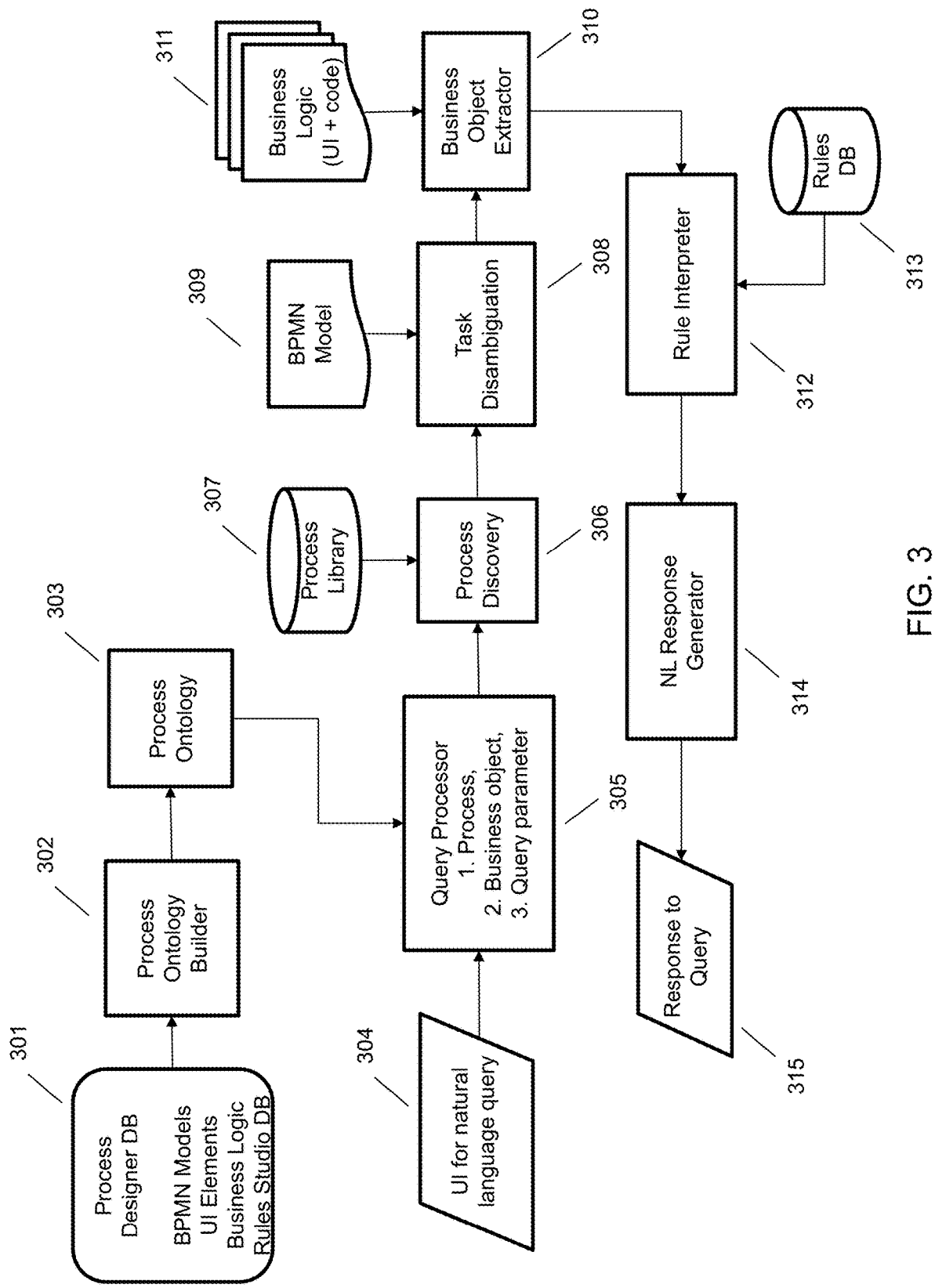
FIG. 3 illustrates an example system architecture for providing a natural language response using a conversational agent in response to receiving a query regarding a business process.

FIG. 3 illustrates an overall system architecture for providing a natural language response using a conversational agent in response to receiving a query regarding a business process. The system may access a process designer database 301 that may include or be derived from business process model and notation models, user interface (UI) elements, business logic or code, a rules studio database, and/or other information references. From the process designer database 301 the system may use a process ontology builder 302 to generate a process ontology 303. When the system receives a natural language query at a user interface 304, the system may employ a query processor 305 that uses the process ontology 303 to identify business process, business object, and query parameter entities from the received query. The system may then perform a process discovery 306 using the process library 307 to identify the process of the query and the business object/task corresponding to the query. The system may also perform task disambiguation 308 using the business process model and notation model 309 and corresponding libraries.

The system may then map the task to corresponding code by applying a business object extractor 310 on the business process model. From the object of the business process model corresponding to the identified task, the system can access the business logic 311 corresponding to that object. The business object may include one or both of the code of the business process and the code of the user interface corresponding to the business process. From the code the system can apply a rule interpreter 312 to interpret the rule found within the code and corresponding to the business object utilizing a rules database 313. Once the rule has been interpreted the system can generate a natural language response using a natural language response generator 314. The system can then provide this generated response to the user 315 at the user interface.

Thus, the described systems and methods represent a technical improvement over current conversational agent systems. The described system is able to automatically respond to user queries as opposed to conventional techniques that required a user respond to the query. Additionally, unlike conventional conversational agents, the described system and methods do not have to be specifically programmed with a conversational flow including nodes and algorithms that are designed by designers and programmers. Thus, the described system and method can be deployed more quickly without requiring the tedious and time-consuming manual programming which is required by the conventional techniques. Additionally, since the conversational agent is able to provide responses to queries by accessing code corresponding to an identified business process and business object, the conversational agent can be deployed across multiple domains, which is not possible using conventional techniques which require that the conversational agent be programmed for a specific domain. Accordingly, the described system and method is more efficient, more versatile, and requires less human intervention than conventional systems.

Figure 4:
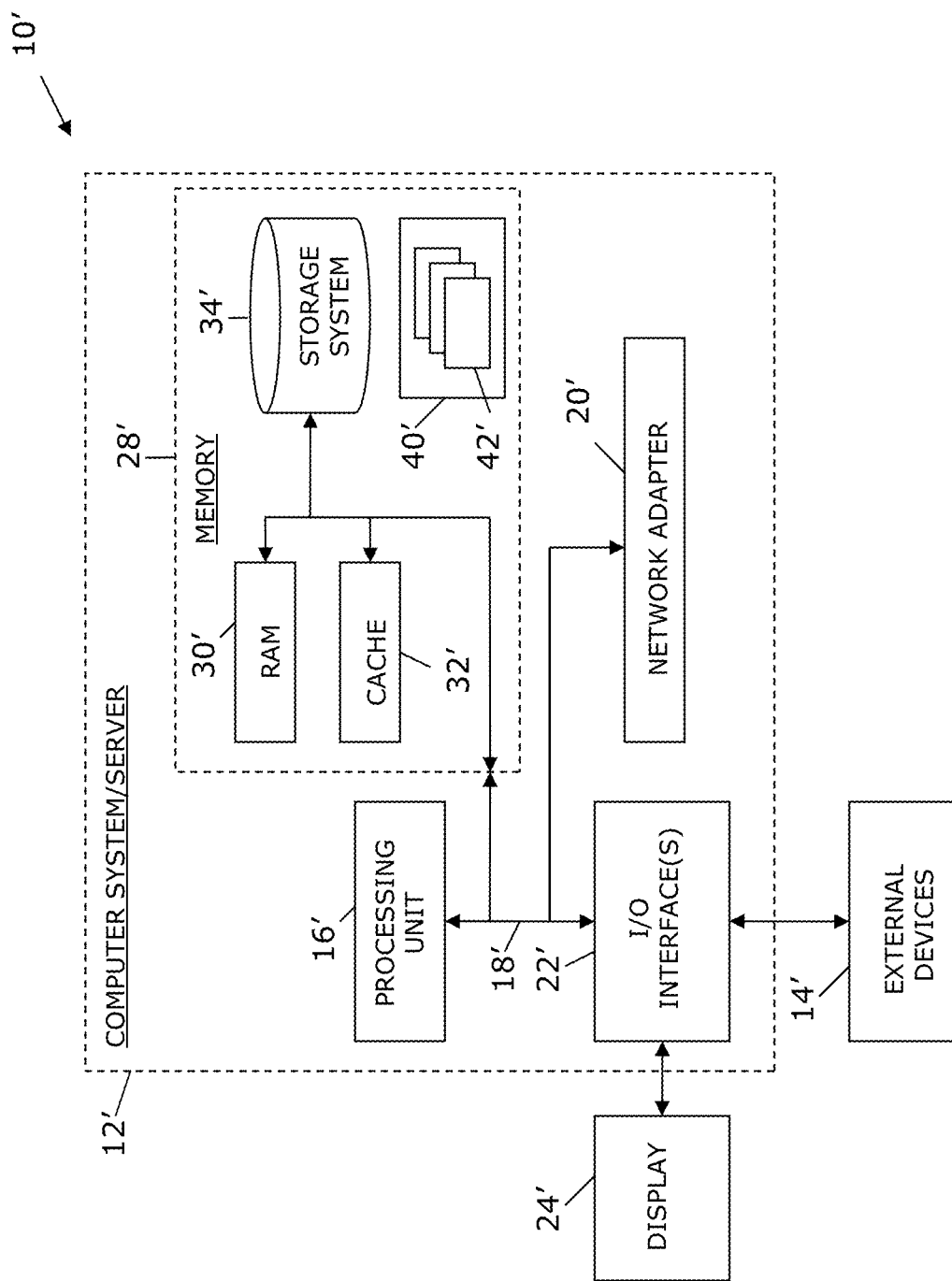
FIG. 4 illustrates a computer system.

As shown in FIG. 4, computer system/server 12' in computing node 10' is shown in the form of a general-purpose computing device. The components of computer system/server 12' may include, but are not limited to, at least one processor or processing unit 16', a system memory 28', and a bus 18' that couples various system components including system memory 28' to processor 16'. Bus 18' represents at least one of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computer system/server 12' typically includes a variety of computer system readable media. Such media may be any available media that are accessible by computer system/server 12', and include both volatile and non-volatile media, removable and non-removable media.

System memory 28' can include computer system readable media in the form of volatile memory, such as random access memory (RAM) 30' and/or cache memory 32'. Computer system/server 12' may further include other removable/non-removable, volatile/non-volatile computer system storage media. By way of example only, storage system 34' can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 18' by at least one data media interface. As will be further depicted and described below, memory 28' may include at least one program product having a set (e.g., at least one) of program modules that are configured to carry out the functions of embodiments of the invention.

Program/utility 40', having a set (at least one) of program modules 42', may be stored in memory 28' (by way of example, and not limitation), as well as an operating system, at least one application program, other program modules, and program data. Each of the operating systems, at least one application program, other program modules, and program data or some combination thereof, may include an implementation of a networking environment. Program modules 42' generally carry out the functions and/or methodologies of embodiments of the invention as described herein.

Computer system/server 12' may also communicate with at least one external device 14' such as a keyboard, a pointing device, a display 24', etc.; at least one device that enables a user to interact with computer system/server 12'; and/or any devices (e.g., network card, modem, etc.) that enable computer system/server 12' to communicate with at least one other computing device. Such communication can occur via I/O interfaces 22'. Still yet, computer system/server 12' can communicate with at least one network such as a local area network (LAN), a general wide area network (WAN), and/or a public network (e.g., the Internet) via network adapter 20'. As depicted, network adapter 20' communicates with the other components of computer system/server 12' via bus 18'. It should be understood that although not shown, other hardware and/or software components could be used in conjunction with computer system/server 12'. Examples include, but are not limited to: microcode, device drivers, redundant processing units, external disk drive arrays, RAID systems, tape drives, and data archival storage systems, etc.

This disclosure has been presented for purposes of illustration and description but is not intended to be exhaustive or limiting. Many modifications and variations will be apparent to those of ordinary skill in the art. The embodiments were chosen and described in order to explain principles and practical application, and to enable others of ordinary skill in the art to understand the disclosure.

Although illustrative embodiments of the invention have been described herein with reference to the accompanying drawings, it is to be understood that the embodiments of the invention are not limited to those precise embodiments, and that various other changes and modifications may be affected therein by one skilled in the art without departing from the scope or spirit of the disclosure.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions. These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

What is claimed is:

1. A method, comprising:
receiving, from a user and at a user interface of a conversational agent, a query related to a business process, the business process indicating a domain of the query and corresponding to a process having defined steps;
identifying, using process entity extraction on the query, (i) the business process and (ii) a business object corresponding to an entity of the query, the entity indicating a task within the domain of the query, wherein the process entity extraction comprises annotating entities within the query using a machine learning model, wherein the machine learning model comprises an entity and attribute recognition machine learning model and is trained using a supervised sequence labelling approach on historical queries, wherein the identifying comprises mapping the annotated entities to business entities, wherein at least one of the business entities corresponds to the business object;
mapping the business object to code corresponding to the business object, wherein the mapping comprises (i) mapping the business object to an object within a business process model using a domain dictionary and (ii) accessing code corresponding to the object within the business process model;
generating a natural language response responsive to the received query, wherein the generating comprises (i) extracting the code corresponding to the business object, (ii) identifying a rule within the extracted code corresponding to a variable of the query, and (iii) generating the natural language response from the identified rule, wherein the identifying a rule comprises traversing an abstract syntax tree representing the extracted code; and
providing, to the user at the user interface of the conversational agent, the natural language response.

2. The method of claim 1, wherein the identifying comprises accessing (i) an ontology corresponding to the business process and (ii) parsing the ontology to find the business object utilizing the extracted entities.

3. The method of claim 2, wherein the ontology is generated from a database corresponding to the business process, the database comprising at least one of: a business process model, user interface elements, code corresponding to the business process, and a rules database.

4. The method of claim 1, wherein the annotating comprises the machine learning model using at least one natural language processing technique.

5. The method of claim 4, wherein the natural language processing technique comprises a parts-of-speech tagger.

6. The method of claim 1, wherein the mapping comprises (i) identifying a user interface element corresponding to the business object and (ii) accessing the code corresponding to the user interface element.

7. The method of claim 6, wherein the accessing the code comprises (i) identifying an application programming interface corresponding to the user interface element and (ii) tracing the application programming interface to the code corresponding to the user interface element.

8. The method of claim 1, wherein the mapping comprises creating code for the business process model by converting an image of the business process model to code form by (i) detecting business process model contours within the image, (ii) detecting business process model objects, and (iii) labeling the detected business process model contours and the detected business process model objects using a business process model library.

9. The method of claim 8, wherein the mapping comprises semantically interpreting the labeled business process model contours and the labeled business process model objects to create the code for the business process model.

10. The method of claim 1, wherein the identifying a rule comprises parsing the code using an abstract syntax tree to define the rule.

11. An apparatus, comprising:
at least one processor; and
a non-transitory computer readable storage medium having computer readable program code embodied therewith and executable by the at least one processor, the computer readable program code comprising:
computer readable program code configured to receive, from a user and at a user interface of a conversational agent, a query related to a business process, the business process indicating a domain of the query and corresponding to a process having defined steps;
computer readable program code configured to identify, using process entity extraction on the query, (i) the business process and (ii) a business object corresponding to an entity of the query, the entity indicating a task within the domain of the query, wherein the process entity extraction comprises annotating entities within the query using a machine learning model, wherein the machine learning model comprises an entity and attribute recognition machine learning model and is trained using a supervised sequence labelling approach on historical queries, wherein the identifying comprises mapping the annotated entities to business entities, wherein at least one of the business entities corresponds to the business object;
computer readable program code configured to map the business object to code corresponding to the business object, wherein the mapping comprises (i) mapping the business object to an object within a business process model using a domain dictionary and (ii) accessing code corresponding to the object within the business process model;
computer readable program code configured to generate a natural language response responsive to the received query, wherein the generating comprises (i) extracting the code corresponding to the business object, (ii) identifying a rule within the extracted code corresponding to a variable of the query, and (iii) generating the natural language response from the identified rule, wherein the identifying a rule comprises traversing an abstract syntax tree representing the extracted code; and
computer readable program code configured to provide, to the user at the user interface of the conversational agent, the natural language response.

12. A computer program product, comprising:
a non-transitory computer readable storage medium having computer readable program code embodied therewith, the computer readable program code executable by a processor and comprising:
computer readable program code configured to receive, from a user and at a user interface of a conversational agent, a query related to a business process, the business process indicating a domain of the query and corresponding to a process having defined steps;
computer readable program code configured to identify, using process entity extraction on the query, (i) the business process and (ii) a business object corresponding to an entity of the query, the entity indicating a task within the domain of the query, wherein the process entity extraction comprises annotating entities within the query using a machine learning model, wherein the machine learning model comprises an entity and attribute recognition machine learning model and is trained using a supervised sequence labelling approach on historical queries, wherein the identifying comprises mapping the annotated entities to business entities, wherein at least one of the business entities corresponds to the business object;
computer readable program code configured to map the business object to code corresponding to the business object, wherein the mapping comprises (i) mapping the business object to an object within a business process model using a domain dictionary and (ii) accessing code corresponding to the object within the business process model;
computer readable program code configured to generate a natural language response responsive to the received query, wherein the generating comprises (i) extracting the code corresponding to the business object, (ii) identifying a rule within the extracted code corresponding to a variable of the query, and (iii) generating the natural language response from the identified rule, wherein the identifying a rule comprises traversing an abstract syntax tree representing the extracted code; and
computer readable program code configured to provide, to the user at the user interface of the conversational agent, the natural language response.

13. The computer program product of claim 12, wherein the identifying comprises accessing (i) an ontology corresponding to the business process and (ii) parsing the ontology to find the business object utilizing the extracted entities.

14. The computer program product of claim 12, wherein the annotating comprises the machine learning model using at least one natural language processing technique.

15. The computer program product of claim 12, wherein the mapping comprises (i) identifying a user interface element corresponding to the business object and (ii) accessing the code corresponding to the user interface element.

16. The computer program product of claim 15, wherein the accessing the code comprises (i) identifying an application programming interface corresponding to the user interface element and (ii) tracing the application programming interface to the code corresponding to the user interface element.

17. The computer program product of claim 12, wherein the mapping comprises creating code for the business process model by converting an image of the business process model to code form by (i) detecting business process model contours within the image, (ii) detecting business process model objects, and (iii) labeling the detected business process model contours and the detected business process model objects using a business process model library.

18. The computer program product of claim 8, wherein the mapping comprises semantically interpreting the labeled business process model contours and the labeled business process model objects to create the code for the business process model.

19. The computer program product of claim 12, wherein the identifying a rule comprises parsing the code using an abstract syntax tree to define the rule.

20. A method, comprising:
receiving, at a user interface of a chatbot, a query from a user requesting assistance with a business process, the business process indicating a field corresponding to the query and corresponding to a process having defined steps;
determining, by accessing an ontology related to the field, (i) the business process, (ii) a business object of the business process, the business object indicating a task of the business process, and (iii) a parameter of the query, the parameter corresponding to a variable of the query, wherein the determining comprises annotating entities within the query using a machine learning model, wherein the machine learning model comprises an entity and attribute recognition machine learning model and is trained using a supervised sequence labelling approach on historical queries, wherein the identifying comprises mapping the annotated entities to business entities, wherein at least one of the business entities corresponds to the business object;
accessing a business process model of the business process, wherein the business process model has corresponding code;
extracting, from the corresponding code, code related to the determined business object; and
providing, from the extracted code, a response to the query, wherein the providing comprises (i) identifying a rule within the extracted code and (ii) generating a response from the rule, wherein the identifying a rule comprises traversing an abstract syntax tree representing the extracted code.

* * * * *